Patented Oct. 9, 1951

2,570,846

UNITED STATES PATENT OFFICE 2,570,846

MINERAL OIL COMPOSITIONS CONTAINING ESTERS OF REACTION PRODUCT OF MALEIC ANHYDRIDE AND STYRENE

Ferdinand P. Otto and Orland M. Reiff, Woodbury, and Robert W. Barrett, Westville, N. J., assignors to Socony-Vacuum Oil Company, Incorporated, a corporation of New York No Drawing. Application March 20, 1947, Serial No. 736,106

4 Claims. (Cl. 252—56)

This invention relates to improved lubricating oil compositions and more particularly to lubricating oil compositions improved by the addition of a small percentage, sufficient to improve the characteristics, of a reaction product of maleic anhydride and styrene, which reaction product has been esterified with a saturated aliphatic alcohol containing around 12 to 14 carbon atoms in a straight chain.

Prior to this invention it was proposed in United States Letters Patent No. 2,047,398 to Arthur Voss et al., granted July 14, 1936, to react compounds such as maleic anhydride, alcohol and styrene to produce artificial resins. Although the products of this patent have certain general similarities to the addition agents of the present invention, the patent does not suggest the addition of the products to mineral oils to improve them and the products specifically described in the patent are for the most part insoluble in oils and incapable of producing the improvement in oils to which the present invention is directed.

United States Letters Patent No. 2,366,517, to Anthony H. Gleason, granted January 2, 1945, describes the addition of copolymers of styrene and an unsaturated ester, which may be an ester of maleic acid, to mineral oil to improve its viscosity index. In accordance with this patent, the maelic acid or anhyride is converted into an ester prior to copolymerization with styrene. Thus, a different product results than that of the present invention. Such products have been found less satisfactory than the addition agents of the present invention.

We have found that maleic anhydride will react with styrene to produce a copolymer, which copolymer is still capable of reacting with alcohols to form esters. When these esters are formed, using a saturated aliphatic alcohol having around 12 to 14 carbon atoms in a straight chain, it has been found that the products are particularly useful as addition agents for mineral oil in that they very effectively lower the pour point of the mineral oil and increase its viscosity index.

The preferred addition agents, in accordance with this invention, are prepared by reacting approximately 6 parts by weight of maleic anhydride with approximately 5 parts by weight of styrene in a dioxane solution, without the use of a catalyst, and then esterifying the product with a saturated aliphatic alcohol, or a mixture of saturated aliphatic alcohols, containing an average of not less than 12 nor more than 14 carbon atoms in a straight chain.

It has been found that other alpha, beta-unsaturated dicarboxylic acid anhydrides may be used, but that in general the products prepared therefrom are not as effective as those prepared from maleic anhydride.

It has further been discovered that higher molecular weight polymers, and better final products, may be prepared by reacting the maleic anhydride with the styrene in the absence of any catalyst, and in solution in a medium such as dioxane, which is a solvent both for the starting material and for the polymer.

As alcohols for the esterification, normal tetradecanol-1 and a mixture of straight chain alcohols containing about 2.5% of C–10 alcohols, 55.0% of C–12 alcohols, 20.5% of C–14 alcohols, 9.0% of C–16 alcohols and 13.0% of C–18 alcohols, have been found particularly effective. This mixture of alcohols will hereafter be referred to simply as "mixed alcohols."

As illustrative of the principles of this invention, a series of products were prepared, incorporated in oil and tested.

Example I

The following reactants and solvent were placed in a 3-necked, round-bottomed flask, containing a reflux condenser, thermometer and mechanically driven stirrer.

| | | |
|---|---|---|
| Maleic anhydride | g | 180 |
| Styrene | g | 150 |
| Benzoyl peroxide | g | 1.0 |
| Xylene | cc | 2400 |

The mixture was then gradually heated to 100° C. at which time the copolymer started to precipitate in the form of a finely divided white powder. Heating was continued for 3 hours at 100–105° C. to insure complete reaction. Following this, the mixture was allowed to cool to room temperature and the copolymer filtered off by means of a Buchner funnel. The copolymer was washed with about 1 liter of benzol and oven dried. The yield of dry products was 245 g. and the saponification number indicated that it contained 50 mol-per cent of maleic anhydride.

The following reactants and solvents were placed in a 3-necked, round-bottomed flask containing a reflux condenser, thermometer and mechanically driven stirrer:

| | | |
|---|---|---|
| Maleic anhydride | g | 30 |
| Styrene | g | 25 |
| Dioxane (peroxide-free) | cc | 250 |

The mixture was refluxed for a period of 3 hours at 100° C. During this period reaction was evidenced by a gradual increase in the viscosity of the solution. After cooling to room temperature, the dioxane solution of the copolymer was added dropwise to approximately 1500 cc. of cold water to precipitate the copolymer. The copolymer was dried and further purified by dissolving it in methyl ethyl ketone and adding the resulting solution dropwise to methyl alcohol. The finely divided precipitate was then filtered off and dried. The yield of product was 41 g. and the saponification number showed it to contain 41 mol-per cent of maleic anhydride.

*Example III*

The following reactants and solvents were placed in a flask equipped with the same accessories as in the preceding examples:

| | | |
|---|---|---|
| Maleic anhydride | g. | 22 |
| Styrene | g. | 18 |
| Dioxane (peroxide-free) | cc. | 180 |

This reaction mixture was exposed to light rays emitted from a mercury-vapor lamp and stirred for a period of 12 hours at average temperature of about 55° C. Purification was effected by adding the dioxane solution dropwise to approximately 700–750 cc. of methyl alcohol. The precipitated copolymer was then removed by filtering, and dried. The yield of product was 26 g. and the saponification number indicated it to contain 46 mol-per cent of maleic anhydride.

*Example IV*

The following reactants and solvent were placed in a 3-liter, 3-necked flask, equipped as in the preceding examples:

| | | |
|---|---|---|
| Maleic anhydride | g. | 120 |
| Styrene | g. | 100 |
| Benzoyl peroxide | g. | 1.0 |
| Toluene | cc. | 1500 |

The mixture was maintained at 75–85° C. for a period of 3 hours. At the end of this time the precipitated copolymer was filtered off and washed with 1 liter of benzene. The product, a finely divided, amorphous white powder, contained 46 mol-per cent of maleic anhydride as indicated by its saponification number.

*Example V*

The following reactants and solvent were placed in a 1-liter, 3-necked flask equipped as in the preceding examples:

| | | |
|---|---|---|
| Styrene-maleic anhydride copolymer (Example I) | g. | 15.0 |
| 1-tetradecanol | g. | 39.4 |
| Xylene | cc. | 200 |
| Sulphuric acid (98%) | cc. | 0.5 |

Between the condenser and the flask was placed a Dean and Stark moisture trap fitted with stopcock for removing water and solvent when so desired. A short while after the mixture was heated to a reflux temperature of 140–145° C. the suspended copolymer gradually reacted to form the half ester. The homogeneous solution thus obtained was maintained at this temperature for a period of 3 hours during which time the water of reaction slowly distilled over into the moisture trap with the aid of the refluxing solvent. The xylene was then permitted to distill off until a temperature of about 180° C. was reached. After remaining for about 15 minutes at this temperature, the product was permitted to cool to room temperature and the viscous composition resulting was diluted with 100 cc. of benzol and stirred with about 10 g. of potassium carbonate to neutralize the acidic catalyst. After filtration through highly silicious clay the filtrate was topped at 140° C. under about 150 mm. of mercury pressure. The residue was blended with 50 g. of mineral oil and further topped at 250° C. under about 5 mm. of mercury pressure to remove unreacted tetradecyl alcohol. The product so obtained was diluted with more mineral oil until the resulting composition contained one part of the product and two parts of oil. The neutralization number of this composition was 0.6 indicating that complete esterification of the copolymer had been accomplished.

*Example VI*

By the method described in Example V, but substituting other alcohols for 1-tetradecanol, a series of other esters of styrene-maleic anhydride copolymers were prepared. The alcohols used were as follows:

| Example No.— | Alcohol Used |
|---|---|
| VI-A | Cyclohexanol. |
| VI-B | 1-Octanol. |
| VI-C | 1-Dodecanol. |
| VI-D | 1-Hexadecanol. |
| VI-E | 1-Octadecanol. |
| VI-F | Oleyl. |
| VI-G | "Mixed Alcohols." |

*Example VII*

Using the same general procedure as that outlined in Example V, a styrene-maleic anhydride copolymer prepared according to Example II was esterified with "mixed alcohols." The following proportions were used:

| | | |
|---|---|---|
| Styrene - maleic anhydride copolymer (Example II) | g. | 15.0 |
| Mixed alcohols | g. | 37.5 |
| Xylene | cc. | 200 |
| Sulphuric acid (98%) | cc. | 0.5 |

*Example VIII*

Using the same procedure and proportions as in Example VII, but substituting a styrene-maleic anhydride copolymer prepared in accordance with Example III for that prepared in accordance with Example II, a generally similar product was prepared.

*Example IX*

Using the same procedure as in Example VII, but substituting a styrene-maleic anhydride copolymer prepared in accordance with Example IV for that prepared in accordance with Example II, a generally similar product was prepared.

*Example X*

A styrene-itaconic acid polymer was prepared by placing the following reactants and solvent in a 2-liter, 3-necked flask equipped with a thermometer, reflux condenser and mechanical stirrer:

| | | |
|---|---|---|
| Itaconic acid | g. | 79 |
| Styrene | g. | 60 |
| Xylene | cc. | 700 |
| Benzoyl peroxide | g. | 6.0 |

The mixture was maintained at a temperature of 120° C. for a period of 2 hours and the precipitated copolymer was filtered off and washed with 1 liter of benzol. The product, a finely divided amorphous white solid contained 48 mol-per cent of itaconic acid as determined by its saponification number.

*Example XI*

In accordance with the general procedure described in Example V, the styrene-itaconic acid polymer of Example X was converted into esters of various alcohols as follows:

| Example No.— | Alcohol Used |
|---|---|
| XI-A | 1-Dodecanol. |
| XI-B | 1-Tetradecanol. |
| XI-C | 1-Hexadecanol. |
| XI-D | "Mixed Alcohols." |

*Example XII*

In order to obtain a comparison between products made by first copolymerizing maleic anhydride and styrene and thereafter esterifying, and products made by copolymerizing maleic acid esters with styrene, dodecyl maleate was copolymerized with styrene by heating in a sealed tube for 48 hours at a temperature of 135° C. The reaction mixture consisted of the following:

Dodecyl maleate _____ cc__ 25.0
Styrene _____ cc__ 25.0
Benzoyl peroxide _____ g__ 1.0

The crude product, a very viscous composition, was purified by dissolving it in benzol and precipitating by the addition of methanol. The dry product, a pale, yellow, glass-like solid contained 23.8% by weight of dodecyl maleate as determined by carbon and hydrogen analysis. The product was insoluble in the following types of mineral lubricating oils.

1. Solvent refined Mid-Continent SAE-30 grade oil having a kinematic viscosity of 11.96 at 210° F. and a pour point of 20° F.
2. Acid-refined Oklahoma City wax distillate having a kinematic viscosity of 4.83 at 210° F.
3. Acid-refined Coastal distillate having a kinematic viscosity of 5.91 at 210° F.

*Example XIII*

The same reaction was tried again using 25 g. of dodecyl maleate, 5.4 g. of styrene and 0.5 g. of benzoyl peroxide. The crude reaction product, a viscous oil, was extracted with 250 cc. portions of a solvent containing methanol and benzene in the ratio of 5 to 3.5. By this treatment, 9.5 g. of a viscous, oily raffinate was obtained, and, upon removal of solvent, 16 g. of an extract. Both fractions were oil soluble.

*Example XIV*

Tetradecyl maleate and styrene were copolymerized in the manner described in Example XII using the following reaction mixture:

Tetradecyl maleate _____ cc__ 25
Styrene _____ cc__ 25
Benzoyl peroxide _____ g__ 1.0

The product obtained was a pale, yellow, hard resin and was insoluble in the mineral lubricating oils listed in Example XII.

*Example XV*

The reaction of Example XIV was tried again using 25 g. of tetradecyl maleate, 5.0 g. of styrene and 0.6 g. of benzoyl peroxide. Purification was effected in the same manner as in Example XIII and there resulted 17.5 g. of raffinate and 7.0 g. of extract. Both were oil soluble.

*Example XVI*

A series of polymerizations or copolymerizations were performed in sealed tubes in the presence of 2% benzoyl peroxide at a temperature of 80° C. for a period of 6 days. The reactants or reactant mixtures were as follows:

XVI-A:
  Di-"mixed alcohols" maleate _____ g__ 15.0
  Benzoyl peroxide _____ percent__ 2
XVI-B:
  Styrene _____ g__ 7.2
  Di-"mixed alcohols" maleate _____ g__ 30.0
  Benzoyl peroxide _____ percent__ 2
XVI-C:
  Styrene _____ g__ 18.6
  Di-"mixed alcohols" maleate _____ g__ 18.6
  Benzoyl peroxide _____ percent__ 2

In order to test the effectiveness of the various products in reducing the pour point and increasing the viscosity index of lubricating oils, a series of comparative tests were made of the effect of various of the products described in various proportions, in lubricating oils.

Two different base oils were used in these tests, oil A being a solvent-refined Mid-Continent SAE-30 grade oil, having a pour point of +20° F. and a kinematic viscosity at 210° F. of 11.96, and oil B being an acid-refined Mid-Continent stock with a kinematic viscosity at 100° F. of 30.49, a kinematic viscosity at 210° F. of 4.83 and a viscosity index of 80.1.

The results are shown in the following table:

*Table I*

| Addition Agent, Product of Ex. No.— | A. S. T. M. Pour Point in Oil A | | | | | Viscosity Index of 1% in Oil B | | |
|---|---|---|---|---|---|---|---|---|
|  | 1/4% | 1/8% | 1/16% | 1/32% | 1/64% | Kin. Visc. at 100° F. | Kin. Visc. at 210° F. | V. I. |
| Blank Oil | | | +20 | | | 30.49 | 4.83 | 80.1 |
| VII | ←30 | ←30 | −30 | −20 | −5 | 41.84 | 6.59 | 115.7 |
| VIII | ←30 | −25 | −10 | | | 42.58 | 6.93 | 126.5 |
| VI-G | −30 | −25 | −10 | | | 33.74 | 5.38 | 102.0 |
| IX | −30 | −25 | −10 | | | 37.78 | 6.00 | 113.1 |
| V | −30 | −30 | −30 | −25 | −10 | 36.64 | 5.72 | 105.3 |
| VI-A | Insoluble Product | | | | | | | |
| VI-B | Insoluble Product | | | | | | | |
| VI-C | +20 | +20 | +20 | | | 34.2 | 5.31 | 94.2 |
| VI-D | +20 | +20 | +20 | | | 37.27 | 5.86 | 109.1 |
| VI-E | +20 | +20 | +20 | | | 33.75 | 5.37 | 101.2 |
| VI-F | Insoluble Product | | | | | | | |
| XI-A | +25 | +25 | | | | 30.55 | 4.87 | 83.7 |
| XI-B | +20 | +20 | | | | 31.11 | 4.92 | 83.9 |
| XI-C | −20 | −10 | | | | 31.44 | 4.95 | 84.2 |
| XI-D | −20 | −5 | | | | 31.26 | 4.90 | 81.3 |
| XIII (Raffinate) | +20 | | | | | 32.18 | 5.00 | 82.9 |
| XIII (Extract) | 1+25 | | | | | 30.82 | 4.86 | 80.4 |
| XV (Raffinate) | +20 | | | | | 32.05 | 5.04 | 87.6 |
| XV (Extract) | 1+25 | | | | | 30.94 | 4.89 | 82.4 |
| XVI-A | −15 | −10 | | | | 30.99 | 4.90 | 83.0 |
| XVI-B | +25 | | | | | 31.37 | 4.94 | 83.7 |
| XVI-C | Insoluble Product | | | | | | | |

[1] 1/2 per cent.

From the above table, it is apparent that the products of Examples V, VII, VIII, VI-G and IX are most effective as pour point depressants. It is also evident that the products of Examples VII, VIII and IX are the most effective as viscosity index improvers. The difference in the improvement effected by the products of the various examples is quite considerable and gives therefore a logical basis for a selection of the reactants and conditions of Examples VII and VIII as preferred.

It is to be understood that such changes in the process of manufacture of the new addition agents, as the use of benzene or other similarly acting solvents in place of dioxane, and the changing of proportions of the reactants to a minor extent, are within the scope of this invention. The copolymerization of esters of maleic acid with styrene, however, has not been found to produce satisfactory addition agents for the purpose of this invention, and hence it is not included.

In accordance with this invention it is contemplated that the new addition agents may be marketed separately and apart from the oils in which they are to be incorporated, that oils incorporating a sufficient percentage of the new addition agents to produce the desired improvement may be marketed, and also that concentrates of the new addition agents in an oil base, and thus ready for mixing with further quantities of oil, may be marketed.

The oils in which these new addition agents are incorporated, or the concentrates in which they are incorporated, may contain any other addition agents that are found desirable, such for example as detergents, agents which will improve the extreme pressure lubricating qualities of the oil or agents which will stabilize the oil against deterioration.

As is indicated by the above table, percentages of the new addition agents from one-sixty-fourth of one per cent to one per cent have been found to produce desirable improvements in the properties of the oils. The use of these addition agents in percentages varying from one-sixty-fourth to ten per cent is contemplated, although in most instances one per cent will be found adequate for effecting pour point depression.

What is claimed is:

1. A mineral lubricating oil containing a minor proportion, sufficient to lower the pour point thereof, of the product obtained by reacting about 6 parts by weight of maleic anhydride with about 5 parts by weight of styrene to produce a copolymer, and then esterifying said copolymer with a mixture of saturated aliphatic alcohols having an average of about 14 carbon atoms per molecule in a straight chain.

2. A mineral lubricating oil containing a minor proportion, sufficient to lower the pour point thereof, of the product obtained by reacting about 6 parts by weight of maleic anhydride with about 5 parts by weight of styrene to produce a copolymer, and then esterifying said copolymer with a mixture of saturated, aliphatic alcohols containing an average of not less than about 12 and not more than about 14 carbon atoms in a straight chain.

3. A mineral lubricating oil containing a minor proportion, sufficient to lower the pour point thereof, of the product obtained by reacting about 6 parts by weight of maleic anhydride with about 5 parts by weight of styrene to produce a copolymer, and then esterifying said copolymer with normal tetradecanol.

4. A mineral lubricating oil containing a minor proportion, sufficient to lower the pour point thereof, of the product obtained from the reaction involving from about 0.7 to 1.0 mol of maleic anhydride and about 1.0 mol of styrene to produce a copolymer, and then esterifying said copolymer with a mixture of saturated, aliphatic alcohols having an average of about 14 carbon atoms per molecule in a straight chain.

FERDINAND P. OTTO.
ORLAND M. REIFF.
ROBERT W. BARRETT.

REFERENCES CITED

The following references are of record in the file of this patent:

UNITED STATES PATENTS

| Number | Name | Date |
|---|---|---|
| 2,047,398 | Voss | July 14, 1936 |
| 2,149,857 | Mikeska | Mar. 7, 1939 |
| 2,366,517 | Gleason | Jan. 2, 1945 |
| 2,370,943 | Dietrich | Mar. 6, 1945 |
| 2,444,328 | Blair | June 29, 1948 |